Patented May 26, 1953

2,640,071

UNITED STATES PATENT OFFICE 2,640,071

CARBONYLATION OF ARYL HALIDES

Henry J. Leibu, Wilmington, Del., assignor to E. I. du Pont de Nemours and Company, Wilmington, Del., a corporation of Delaware No Drawing. Application February 9, 1951, Serial No. 210,290

6 Claims. (Cl. 260—475)

This invention relates to processes for carbonylation of organic compounds. The invention concerns a method for carbonylation of aromatic halides wherein the catalyst which is employed is a solid complex of nickel carbonyl.

Heretofore aromatic halides have been carbonylated in the presence of nickel carbonyl as disclosed in copending applications S. N. 96,137, S. N. 96,138, and S. N. 96,164, filed May 28, 1949 now U. S. Patents 2,565,462, 2,565,463, and 2,565,461, respectively. The present invention constitutes an improvement over these previously disclosed processes by providing a process which employs a specific solid catalyst from which the carbonylation products can be removed quite readily by the known methods for separating a solid phase from a fluid phase.

In accordance with the present invention the organic compound to be carbonylated is heated under carbonylation conditions in the presence of a triphenyl phosphine-nickel carbonyl complex of the formula

[(C$_6$H$_5$)$_3$P]$_2$Ni(CO)$_2$

The present invention provides a method for preparing carbonylation products from aryl halides, such as p-dichlorobenzene, by heating such halide, in the presence of triphenyl phosphine-nickel carbonyl complex, with carbon monoxide under carbonylation conditions. In general, the temperatures employed in the practice of this invention are in the range of about 250° to 450° C., preferably 300° to 400° C. The pressures are generally superatmospheric, preferably in excess of about 50 atmospheres. Excellent results are obtained at pressures of about 300 to 1000 atmospheres.

The triphenyl phosphine-nickel carbonyl may be employed with or without an inactive support such as silica gel. In a typical method of practising the invention, p-dichlorobenzene is heated with carbon monoxide and an alkoxy donor, such as an alkanol or alkyl ether, e. g. dialkyl ether, dialkyl acetal, or alkoxy alcohol, etc., in the presence of the triphenyl phosphine-nickel carbonyl complex, under the conditions of temperature and pressure hereinabove set forth. The resulting mixture contains terephthalate esters, largely dialkyl terephthalate, and also acidic carbonylation products. If the desired product is dialkyl terephthalate these acidic products can be removed by converting them to esters prior to distillation; in this manner dialkyl terephthalate of "polymer grade" (i. e. sufficiently free of acid for use in making high quality poly- terephthalates) can be obtained. Any by-product p-chlorobenzoic acid or ester can be recycled to the carbonylation zone.

The invention is illustrated further by means of the following examples.

*Example 1.*—A triphenyl phosphine-nickel carbonyl complex was prepared by mixing 10 grams of triphenyl phosphine with 3.02 grams of Ni(CO)$_4$ in 100 ml. diethyl ether at 30° C. The solid complex which separated immediately was allowed to stand overnight after which it was removed by filtration and washed twice with methanol. The complex melted at 180° C. with decomposition at 187° C. This identified the complex as [(C$_6$H$_5$)$_3$P]$_2$Ni(CO)$_2$. To a stainless steel shaker tube of about 300 ml. capacity was added 53 grams of methanol, 121 grams of methyl acetate, 15.4 grams of p-dichlorobenzene and 3.6 grams of the above complex. The tube was heated with agitation at 345° to 360° C. for one hour with carbon monoxide injection at a pressure of 350 atmospheres. The contents of the tube were then withdrawn, and it was found that the gaseous components contained only traces of nickel carbonyl. Distillation of the liquid product under diminished pressure gave p-dichlorobenzene (50% recovery), methyl p-chlorobenzoate (30% conversion) and dimethyl terephthalate (10% conversion). The experiment was repeated at a temperature of 220°, and virtually no conversion of p-dichlorobenzene took place.

*Example 2.*—To a solution of 10 grams of triphenyl phosphine in 100 ml. diethyl ether was added 30 grams of silica gel granules and 3.2 grams of nickel carbonyl. The mixture was allowed to stand overnight, was filtered, and washed with diethyl ether. The nickel content of the resulting catalyst, after being dried on a water bath under diminished pressure was about 0.1%. A shaker tube run was made with a feed comprising 53 grams of methanol, 121 grams of methyl acetate, 15.4 grams of p-dichlorobenzene and 12.4 grams of the supported catalyst. There was obtained a 38% conversion to methyl p-chlorobenzoate and 10% conversion dimethyl terephthalate. Off-gas analysis showed a trace of nickel carbonyl. The catalyst in this run was recovered by filtration. The recovered catalyst was used again with a reaction mixture comprising 43.2 grams of methanol, 98.5 grams of methyl acetate, and 12.6 grams of p-dichlorobenzene. The carbonylation reaction was carried out at a temperature of 345° to 350° C. under a pressure of 300 to 360 atmospheres of carbon monoxide. There was obtained an 18.5% conversion to methyl p-chlorobenzoate and a 3.4% conversion to dimethyl terephthalate at 32.6% conversion of the p-dichlorobenzene.

It is to be understood that the foregoing examples are illustrative only, and that numerous embodiments of the invention will occur to those who are skilled in the art.

I claim:

1. A process for carbonylation of p-dichlorobenzene which comprises heating p-dichlorobenzene with carbon monoxide in the presence of triphenyl phosphine-nickel carbonyl complex of the formula $[(C_6H_5)_3P]_2Ni(CO)_2$ at a temperature in the range of about 250° to 450° C. under superatmospheric pressure and thereafter recovering from the resulting mixture the carbonylation product thus obtained.

2. A process for carbonylation of p-dichlorobenzene which comprises heating p-dichlorobenzene with carbon monoxide in the presence of triphenyl phosphine-nickel carbonyl complex of the formula $[(C_6H_5)_3P]_2Ni(CO)_2$ at a temperature in the range of about 250° to 450° C. under superatmospheric pressure in the presence of an alkoxy donor of the class consisting of alkanols and alkyl ethers and thereafter recovering from the resulting mixture the carbonylation product thus obtained.

3. A process for carbonylation of p-dichlorobenzene which comprises heating p-dichlorobenzene with carbon monoxide in the presence of triphenyl phosphine-nickel carbonyl complex of the formula $[(C_6H_5)_3P]_2Ni(CO)_2$ at a temperature in the range of about 250° to 450° C. under a pressure in excess of 50 atmospheres in the presence of an alkoxy donor of the class consisting of alkanols and alkyl ethers and thereafter recovering from the resulting mixture the carbonylation product thus obtained.

4. A process for carbonylation of p-dichlorobenzene which comprises heating p-dichlorobenzene with carbon monoxide in the presence of triphenyl phosphine-nickel carbonyl complex of the formula $[(C_6H_5)_3P]_2Ni(CO)_2$ at a temperature in the range of about 300° to 400° C. under a pressure of 300 to 1000 atmospheres in the presence of an alkoxy donor of the class consisting of alkanols and alkyl ethers and thereafter recovering from the resulting mixture the carbonylation product thus obtained.

5. A process for carbonylation of p-dichlorobenzene which comprises heating p-dichlorobenzene, methyl acetate and methanol with carbon monoxide at a temperature in the range of 300° to 400° C. at a pressure of 300 to 1000 atmospheres, in the presence of a triphenyl phosphine-nickel carbonyl complex of the formula $[(C_6H_5)_3P]_2Ni(CO)_2$ separating at least a part of the fluid portion of the resulting mixture from the solid triphenyl phosphine-nickel carbonyl catalyst, recovering dimethyl terephthalate from the said fluid portion by distillation, and using the said triphenyl phosphine-nickel carbonyl complex for carbonylation of a further quantity of p-dichlorobenzene.

6. A process for carbonylation of p-dichlorobenzene which comprises introducing p-dichlorobenzene, carbon monoxide, methanol, methyl acetate and $[(C_6H_5)_3P]_2Ni(CO)_2$ into a pressure resistant vessel, heating the mixture at a temperature in the range of 300° to 400° C. at a pressure of 300 to 1000 atmospheres, removing the resulting mixture from the reaction zone, and distilling liquid components thereof under subatmospheric pressure, whereby methyl p-chlorobenzoate and dimethyl terephthalate are obtained.

HENRY J. LEIBU.

References Cited in the file of this patent

UNITED STATES PATENTS

| Number | Name | Date |
|---|---|---|
| 2,565,462 | Prichard et al. | Aug. 28, 1951 |
| 2,565,464 | Tabet | Aug. 28, 1951 |

FOREIGN PATENTS

| Number | Country | Date |
|---|---|---|
| 621,520 | Great Britain | Apr. 11, 1951 |